(12) United States Patent
Grosspietsch et al.

(10) Patent No.: US 6,294,854 B1
(45) Date of Patent: Sep. 25, 2001

(54) DRIVE ARRANGEMENT FOR A MOTOR VEHICLE

(75) Inventors: Wolfgang Grosspietsch, Schweinfurt; Martin Kretzschmar, Dresden, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/375,972

(22) Filed: Aug. 17, 1999

(30) Foreign Application Priority Data

Aug. 17, 1998 (DE) .............................................. 198 37 115

(51) Int. Cl.[7] .................................................... H02K 49/00
(52) U.S. Cl. ................................ 310/92; 180/165; 310/78
(58) Field of Search ..................................... 310/92, 67 R, 310/77, 78, 75 R, 96, 100; 290/38 R, 38 B, 47; 180/165; 74/574

(56) References Cited

U.S. PATENT DOCUMENTS

| | | | | |
|---|---|---|---|---|
| 4,827,798 | * | 5/1989 | Oldfield | 188/269 |
| 5,185,543 | * | 2/1993 | Tebbe | 310/51 |
| 5,691,588 | * | 11/1997 | Lutz et al. | 310/92 |
| 5,755,302 | | 5/1998 | Lutz et al. | |
| 5,927,452 | * | 7/1999 | Freise et al. | 310/74 |
| 5,982,116 | * | 11/1999 | Yang | 318/77 |

FOREIGN PATENT DOCUMENTS

| | | | |
|---|---|---|---|
| 3230607 A1 | 2/1984 | (DE) | F16F/15/18 |
| 43 23 601 A1 | 1/1995 | (DE) | B60K/6/04 |
| 19618865 A1 | 11/1997 | (DE) | B60K/6/02 |
| 0-322-928-A1 | * 5/1987 | (EP) | . |
| 0437 266 A2 | 7/1991 | (EP) | B60L/11/16 |
| 0-743-208 A2 | * 11/1996 | (EP) | . |
| 4274926 | 9/1992 | (JP) | B60K/17/04 |
| 5024448 | 2/1993 | (JP) | B60K/17/04 |
| 6-14445 | 2/1994 | (JP) | B60K/17/04 |
| 8-511495 | 3/1996 | (JP) | . |

* cited by examiner

Primary Examiner—Tran Nguyen
(74) Attorney, Agent, or Firm—Cohen, Pontani, Lieberman & Pavane

(57) ABSTRACT

A drive arrangement for a motor vehicle, which has at least one internal combustion engine and a down-line clutch, via which the internal combustion engine can be connected to an output drive shaft. An electric machine is provided and includes a rotor and a stator, wherein the rotor can be coupled to a drive train formed by the internal combustion engine, the clutch and the output drive shaft by at least one switchable interlocking device.

11 Claims, 11 Drawing Sheets

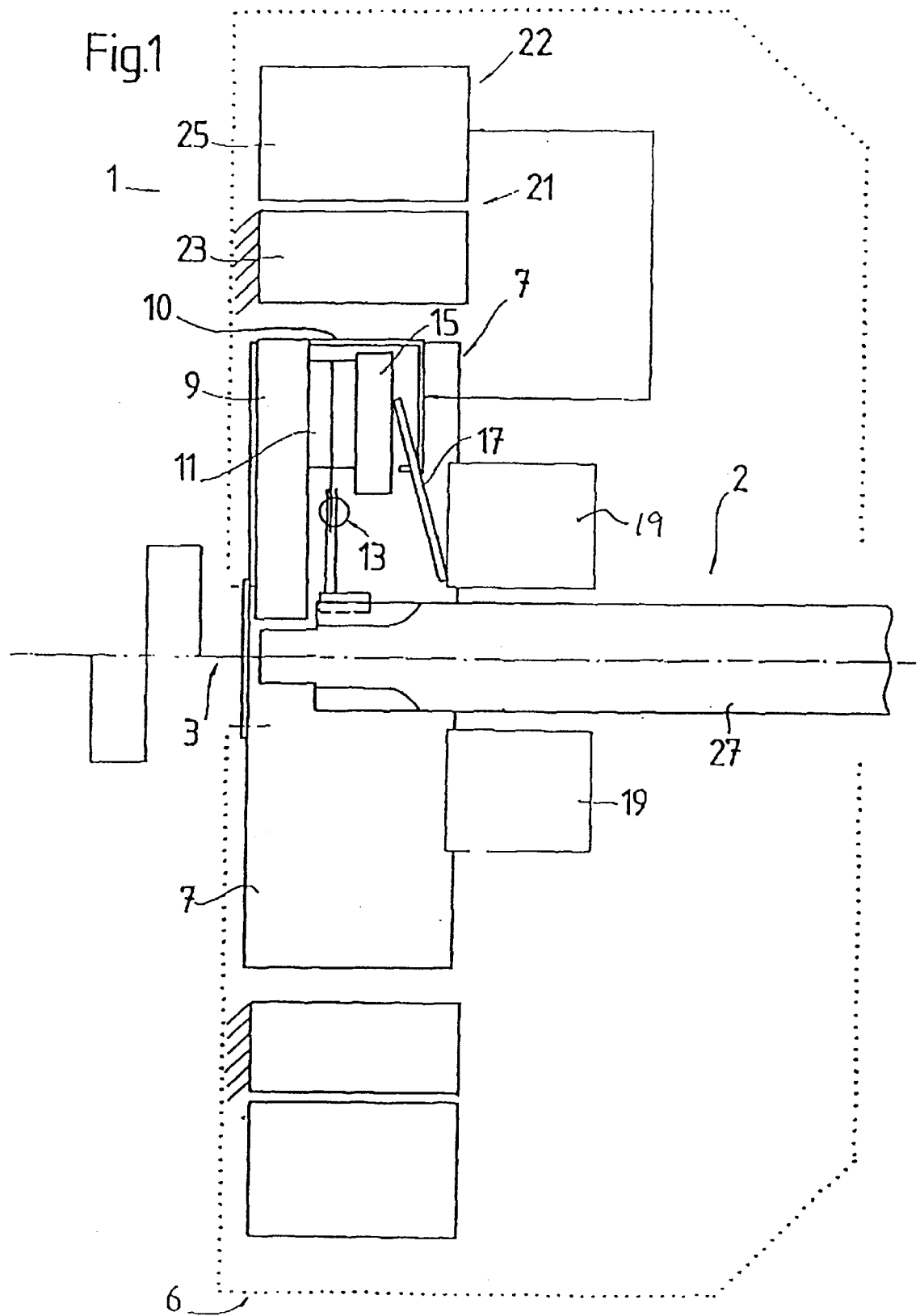

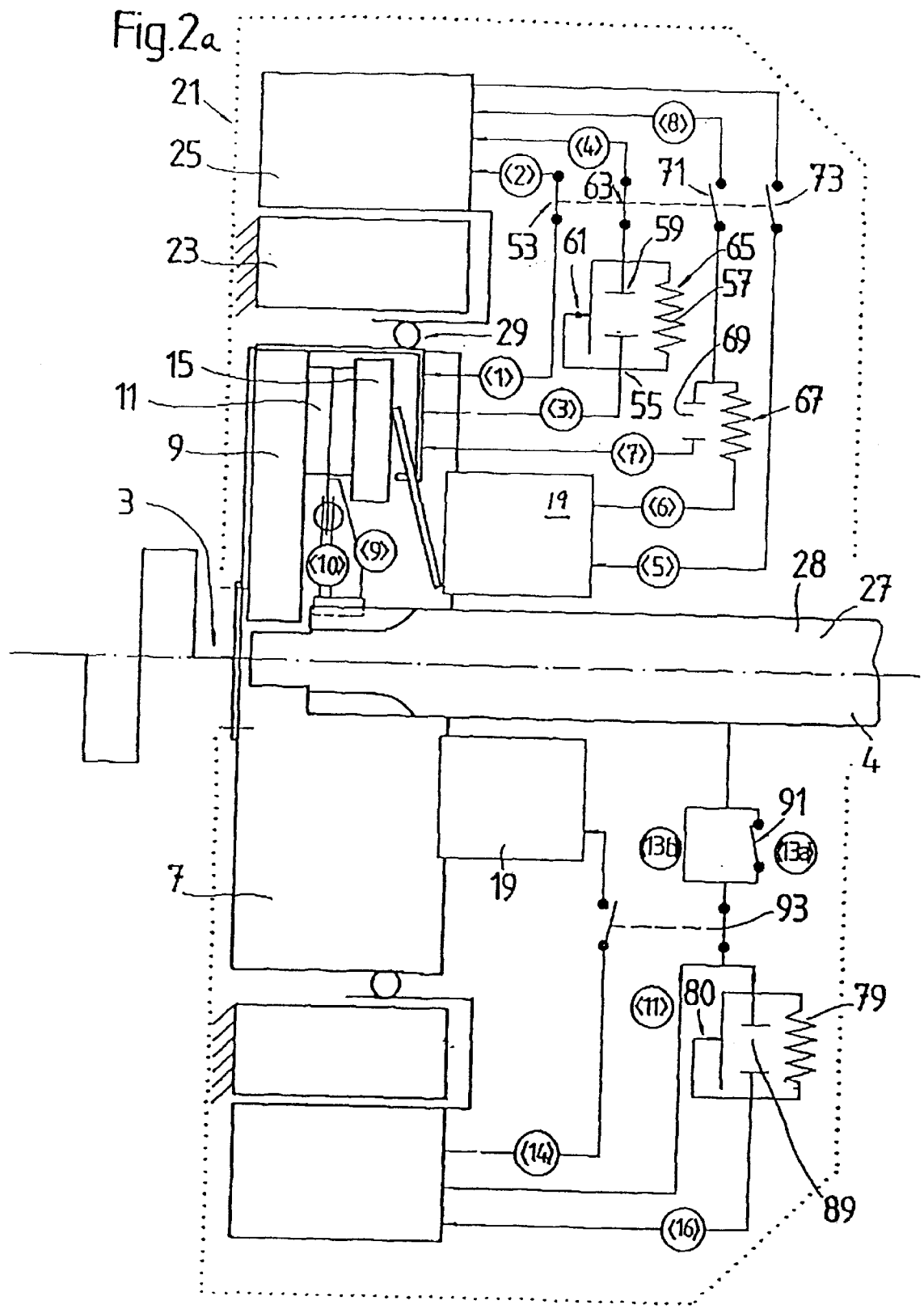

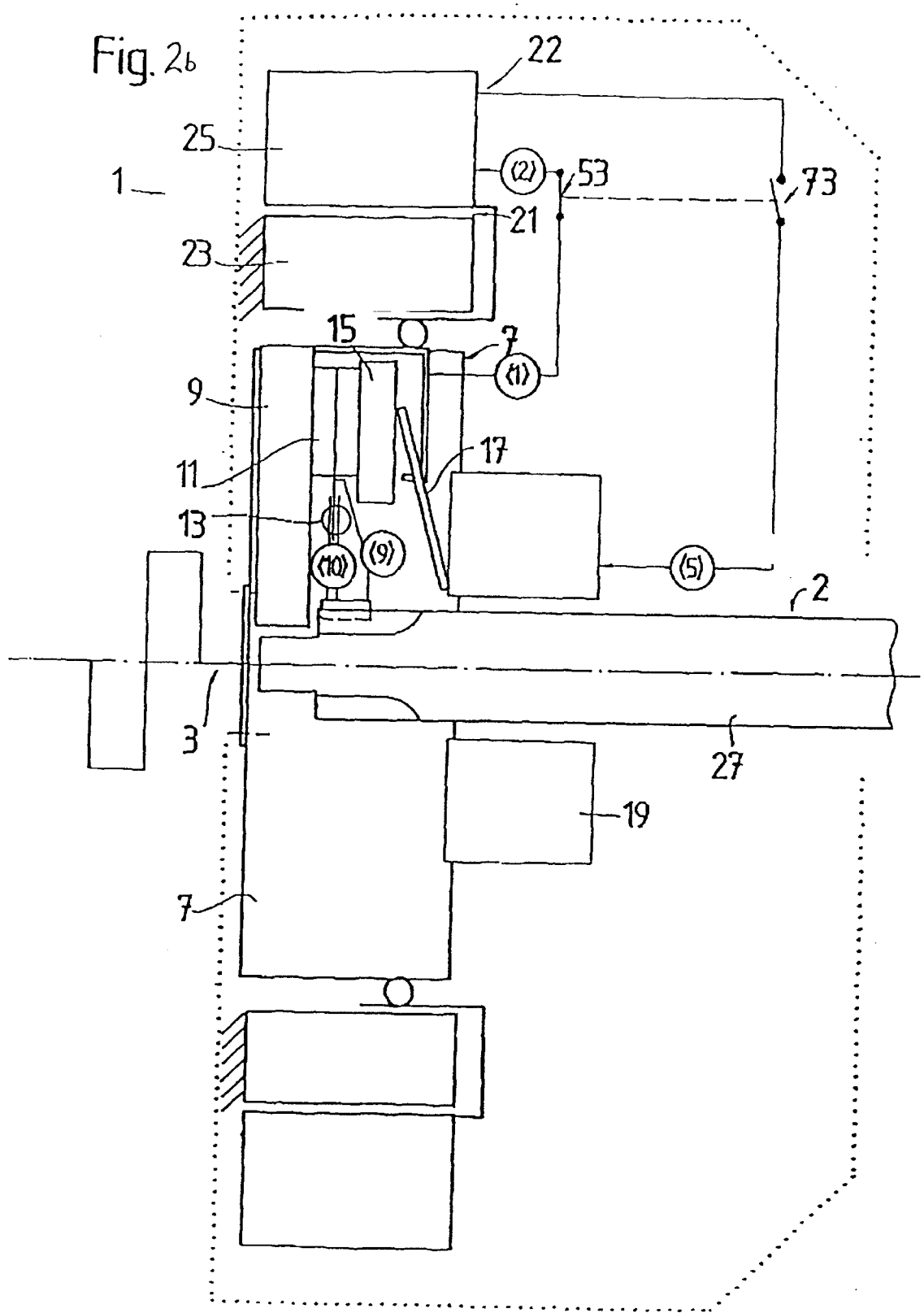

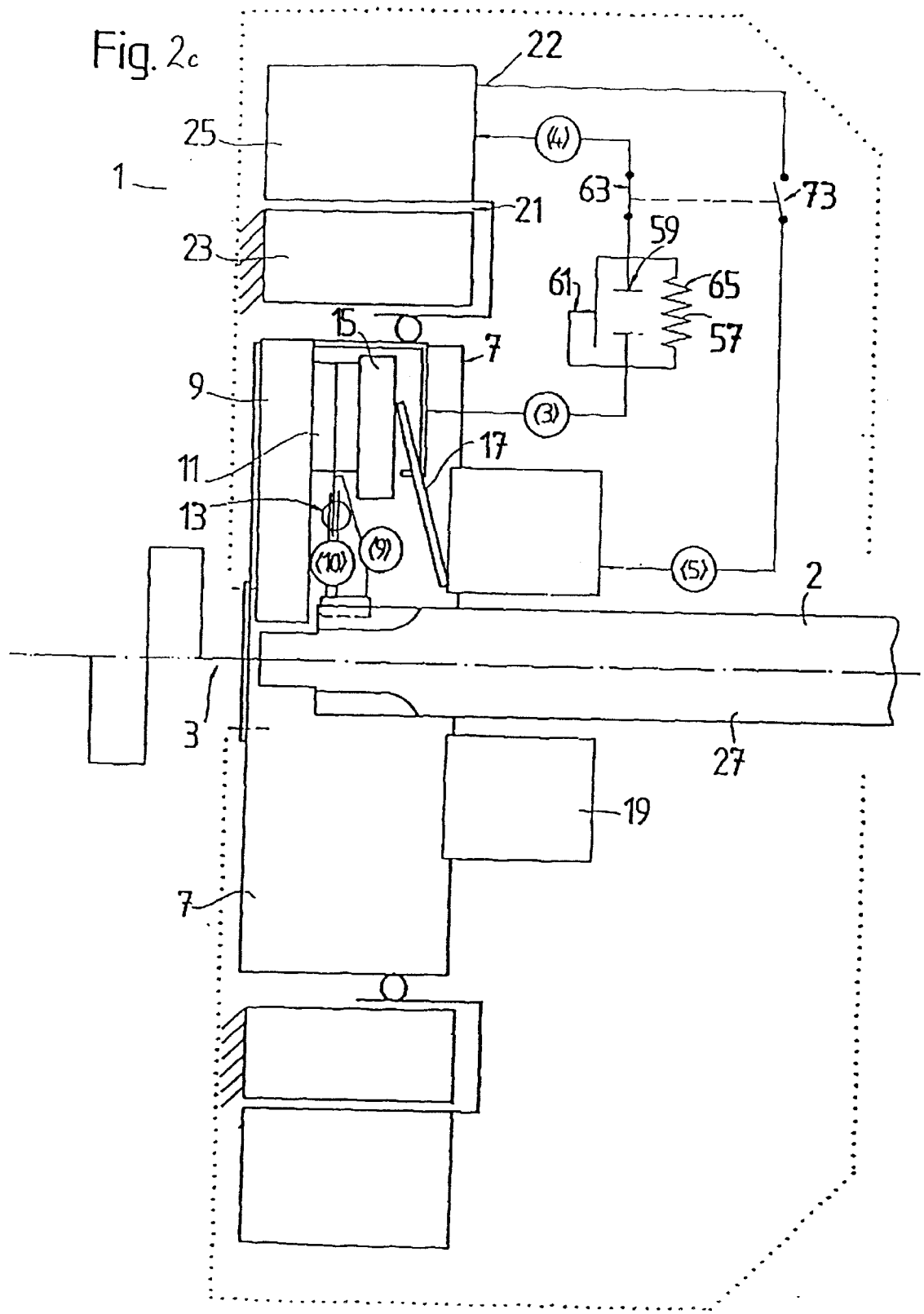

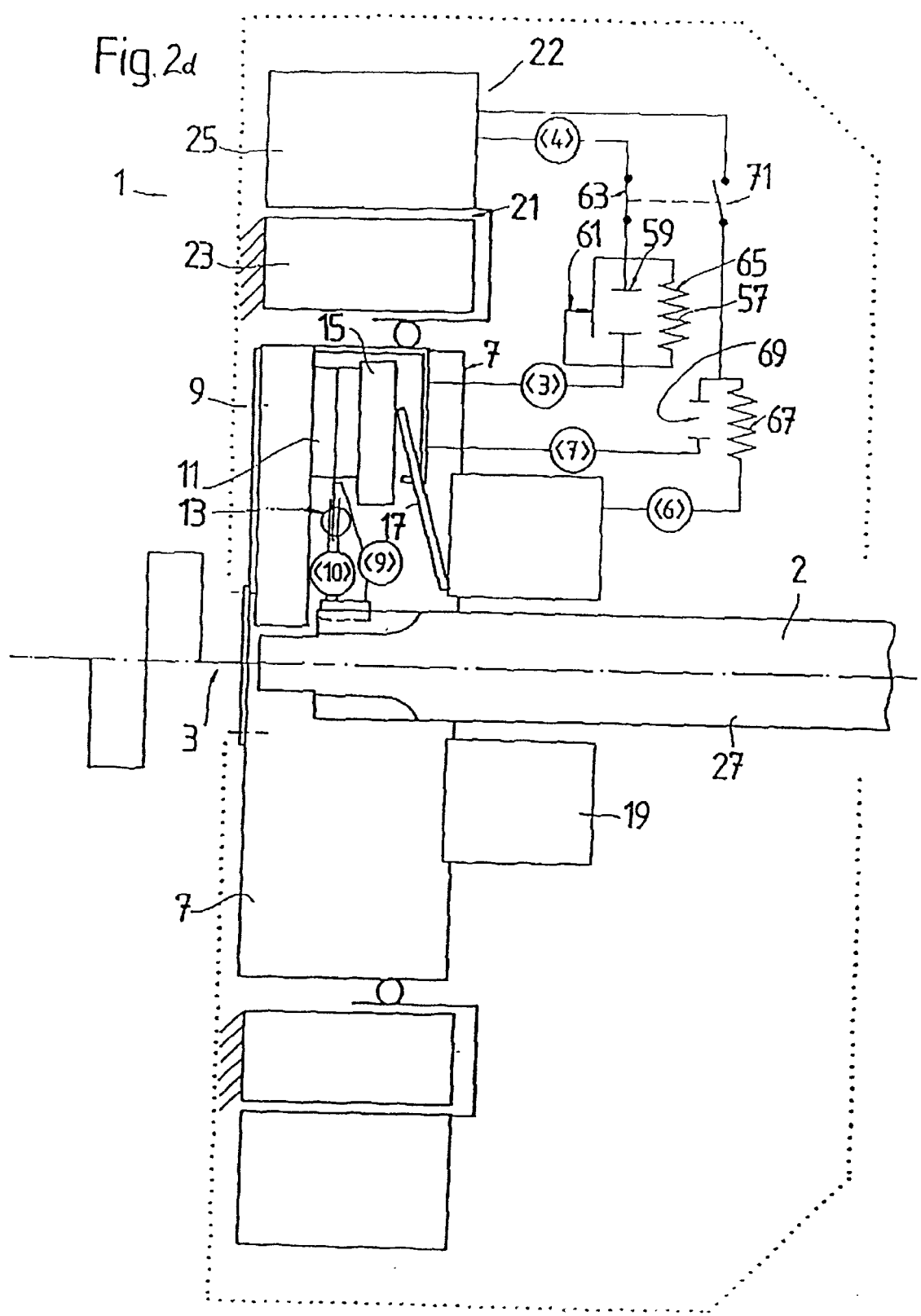

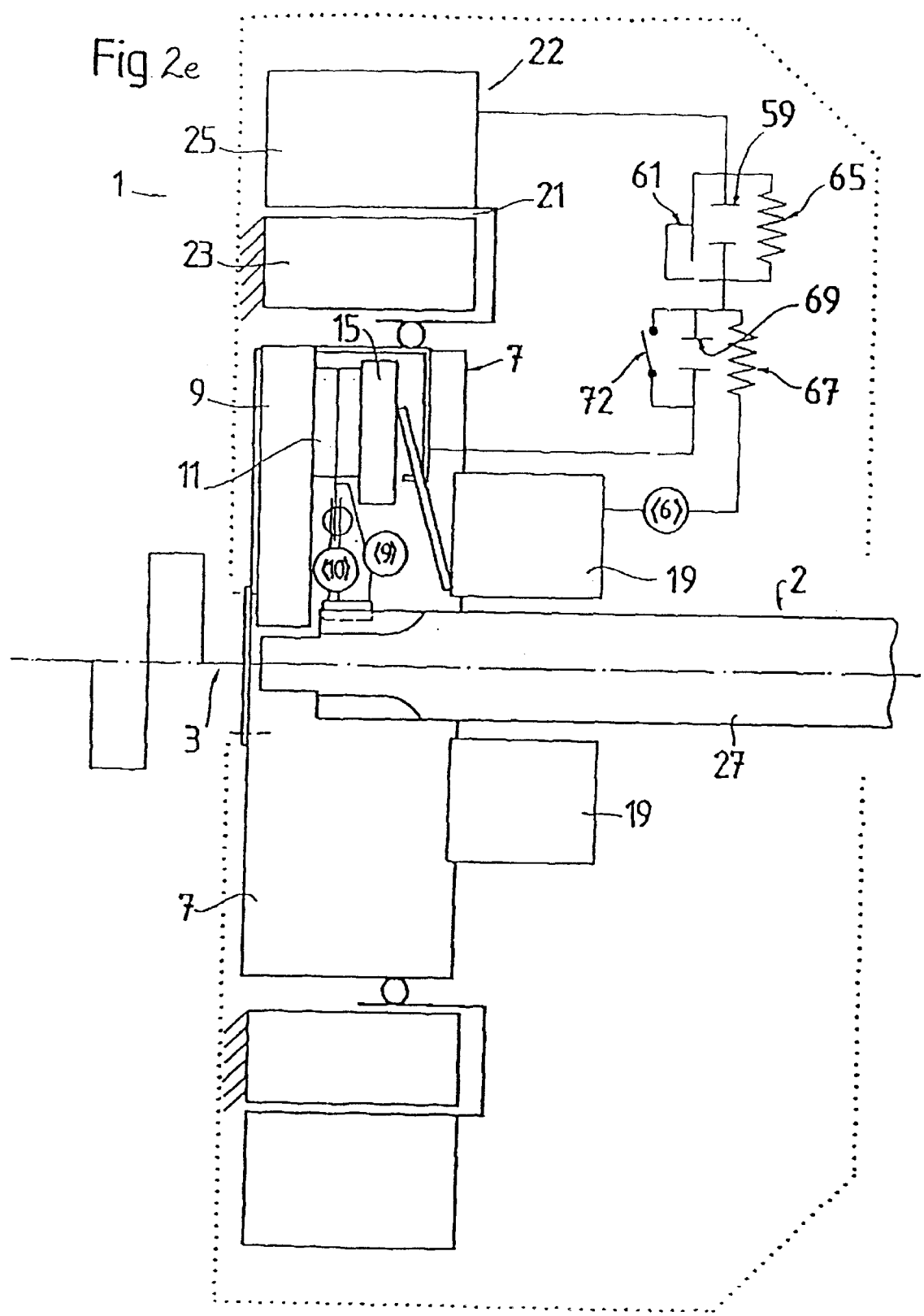

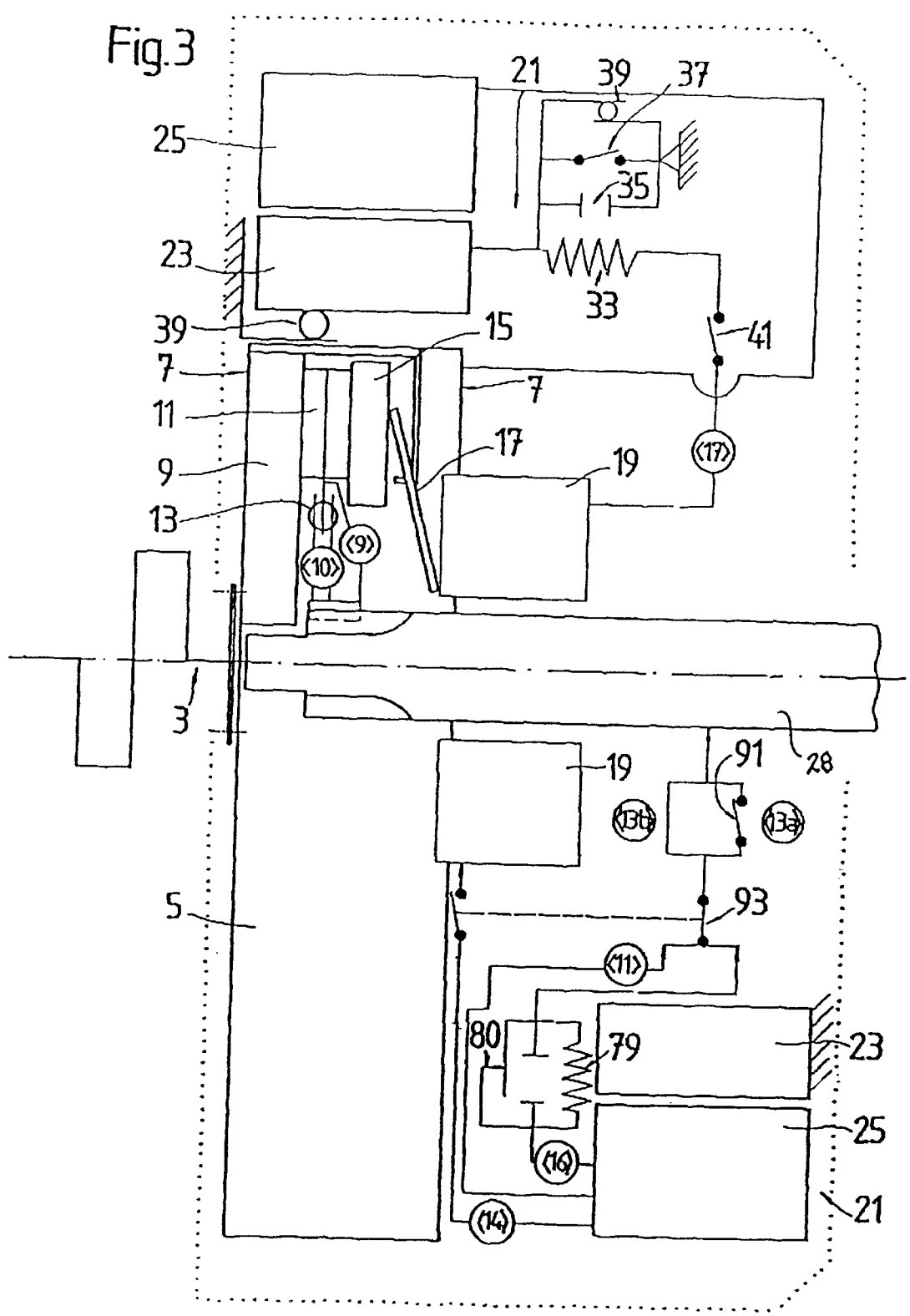

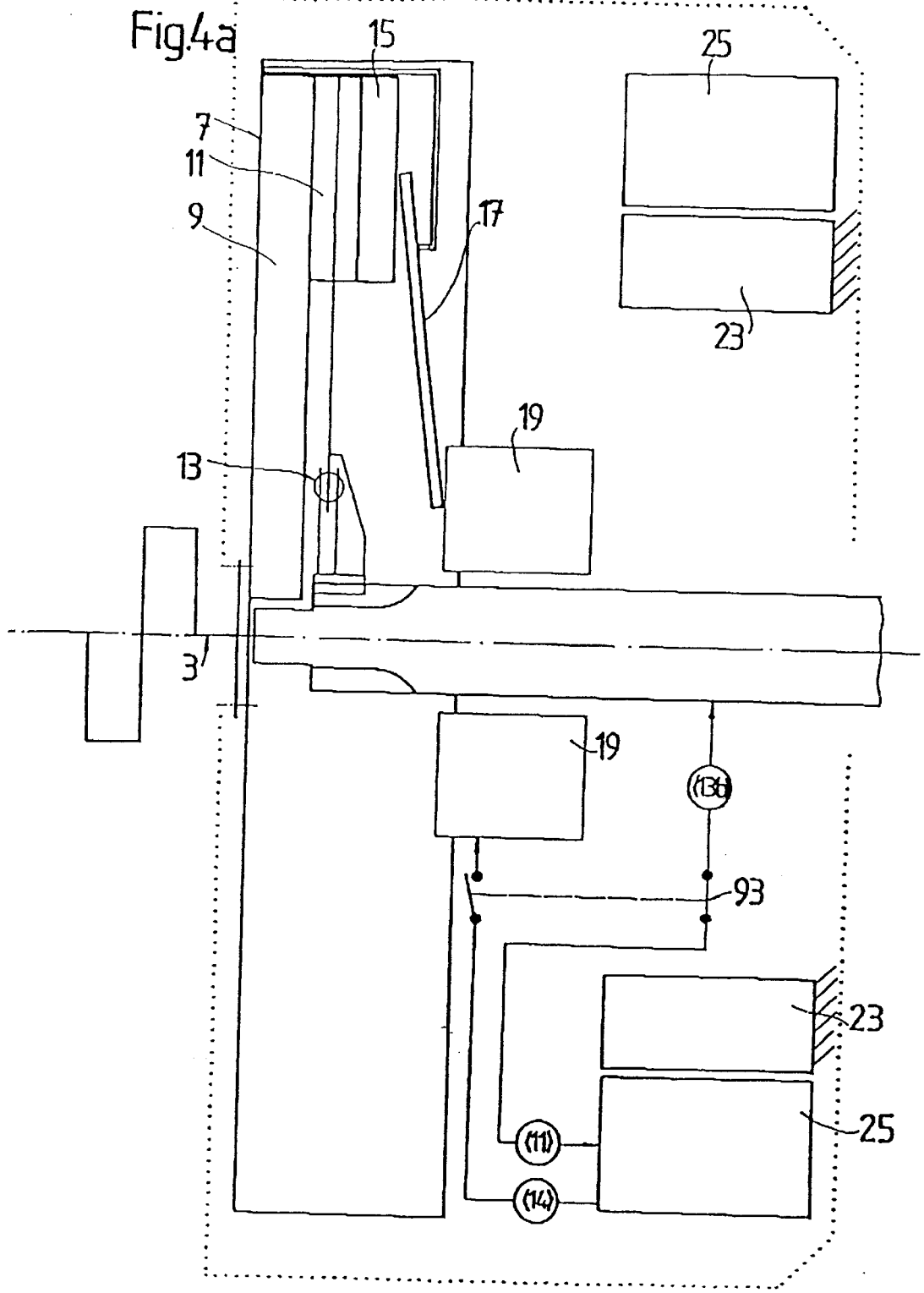

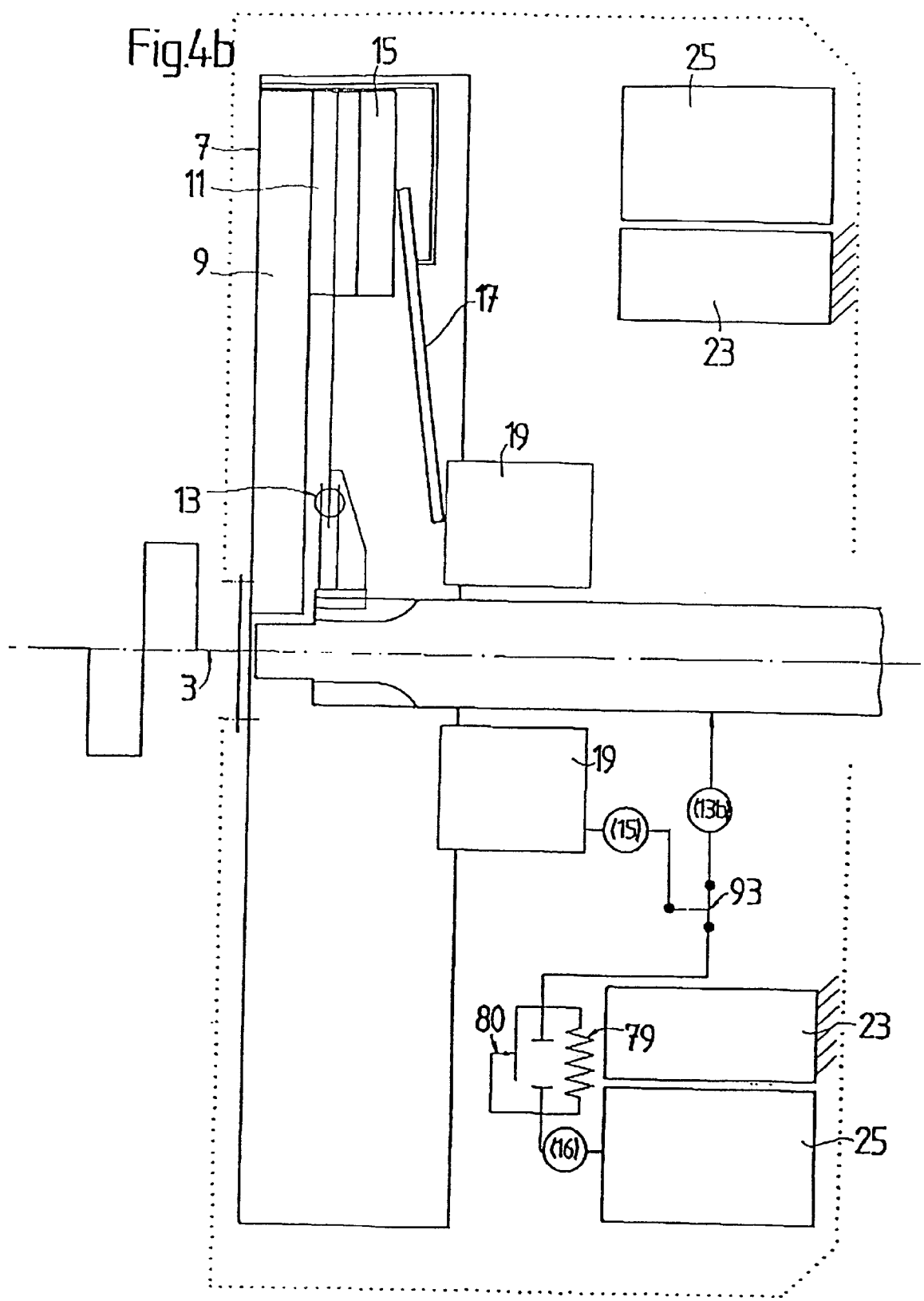

Fig.5a
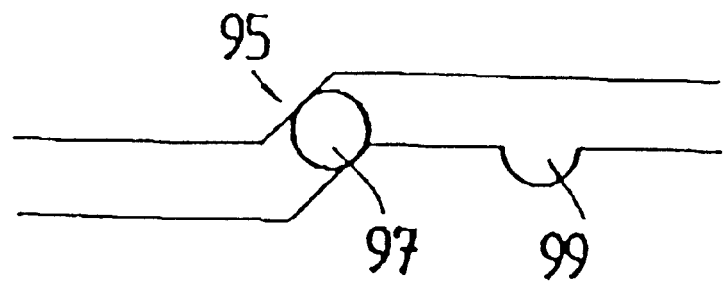
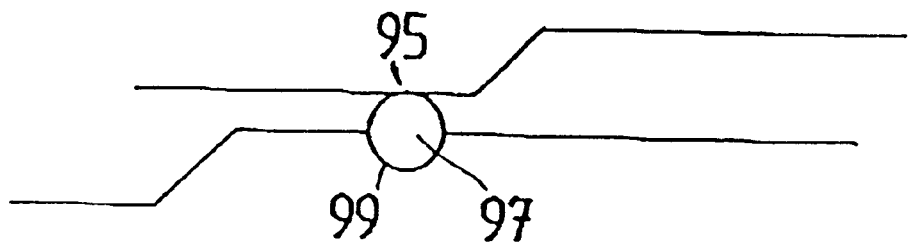
Fig.5b
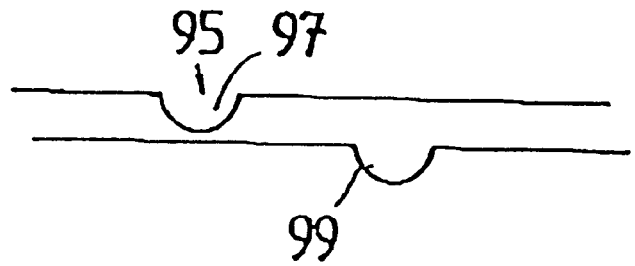
Fig.5c

DRIVE ARRANGEMENT FOR A MOTOR VEHICLE

BACKGROUND OF THE INVENTION

1. Field of the Invention

The invention relates motor vehicles, and more particularly to a drive arrangement for a motor vehicle having an internal combustion engine.

2. Description of the Related Art

DE 43 23 601 A1 has already disclosed a drive arrangement for a motor vehicle, having an internal combustion engine, a clutch and an electric machine. As an output, the internal combustion engine has a crankshaft which can be connected via an interposed clutch to an output drive shaft which, at the same time, is a gearbox input shaft. The clutch is at least partially arranged radially inside an electric machine. The electric machine has a stator permanently connected to the housing of the engine and a rotor that is connected to the output drive shaft in a rotationally fixed manner connected with the interposition of torsional vibration dampers. It is also possible for pressure plates provided in the clutch to be connected to the output drive shaft in a rotationally fixed manner via torsional vibration dampers. The disadvantage is that the coupling between the rotor and gearbox input shaft, apart from the twisting angle of the torsional vibration damper, is of rigid design. As a result, the electric motor is capable of exerting an influence only on the rotor or gearbox input shaft.

DE 196 18 865 A1 has disclosed a drive arrangement for a motor vehicle, which has an electric machine arranged between the internal combustion engine and gearbox. This electric machine comprises a stator that is permanently connected to the housing of the engine, and a rotor that is permanently connected to the crankshaft. By means of a friction clutch arranged between the electric machine and gearbox, it is possible to uncouple the internal combustion engine from the gearbox in order to carry out a shifting operation.

A disadvantage with this arrangement is that during any acceleration of the internal combustion engine, the rotor also has to be accelerated as part of the flywheel mass, resulting in a reduction in the maximum acceleration of the crankshaft. As a result, there is associated inertia of the drive train.

SUMMARY OF THE INVENTION

It is an object of the invention is to provide a drive arrangement with improved vibration damping. It is another object of the invention to widen the field of use of the electric machine and provide a drive arrangement enabling an increased reaction speed of the motor vehicle.

Torque fluctuations introduced by the internal combustion engine depend on its ignition frequency or rotational speed. As a result of the measure that the rotor can be coupled to the drive train, the clutch and the output drive shaft by means of a switchable interlocking device, the inertial mass of the drive train, which acts as a flywheel mass, can be varied by coupling or uncoupling the rotor, for example as a function of the rotational speed or of the desired acceleration of the motor vehicle. If, on account of the driving situation, only slight torque fluctuations are expected, a low inertial mass is adequate as the flywheel mass in order to damp the torque fluctuations. The drive arrangement, and hence the motor vehicle, have a high reaction speed on account of the low inertial mass that acts as a flywheel and therefore as the mass to be accelerated during a desired acceleration operation. If, on account of the operating situation of the motor vehicle, greater torque fluctuations are to be expected, the inertial mass can be increased by coupling the rotor to the drive train by means of switching the interlocking device. It is preferable for the rotor to be accelerated to the rotational speed of the drive train by activating the electric machine, and to be coupled to the drive train when the rotational speeds are equal or virtually equal. Once the rotor is coupled, then the activation of the electric machine may be discontinued, which means that the rotor is used with the function of a passive absorber. If required, the electric machine can be activated for the purpose of active vibration damping, by a torque opposed to the torque fluctuation being introduced into the drive train by the electric machine, such as disclosed, for example, by DE 32 30 607 A or EP 437 266 A2.

Furthermore, it has been shown to be advantageous to couple the rotor to the flywheel by means of the interlocking device. The rotor is preferably arranged coaxially with the flywheel assigned to the internal combustion engine. In order to provide a high moment of inertia, it is advantageous to provide an external rotor type as the electric machine which, because of the large radius, has a high moment of inertia. It is also preferable for a compact clutch to be arranged radially inside the electric machine as the clutch. It is also possible for other clutches, such as multi-plate clutches or wear-adjusting clutches to be provided. This drive arrangement is particularly compact and is especially suitable for use in passenger motor vehicles, in which the installation space is particularly tight. For use in utility motor vehicles, it may be advantageous to use a friction clutch having a large diameter, via which a high torque can be transmitted. There is generally more installation space available in utility motor vehicles, so that a parallel arrangement of electric machine and clutch is possible.

In another embodiment, a torsional vibration damper is interposed so as to couple the rotor to the drive train. This torsional vibration damper may comprise, for example, a spring element or else resilient dampers and associated stops. It has been shown to be advantageous to provide an adjustment mechanism for adjusting the position of rotor relative to the component to which the rotor can be coupled. By means of adjusting the relative position of rotor and the associated component of the drive train, the effectiveness and the working point of the torsional vibration damper is adjustable. As a result, when the rotor is coupled, the torsional vibration damping can be matched to the expected vibrations.

In a further embodiment, provision is made for the clutch to be provided with a rotationally operated clutch operator, which can be operatively connected to the electric machine. In order to disengage the clutch, the necessary rotational movement can be introduced by activating the electric machine. It is therefore possible for the electric machine to be used for active and passive vibration damping (particularly in operating situations in which severe vibration is to be expected), and to be provided for operating the clutch. The torque introduced by the internal combustion engine is preferably reduced before the clutch is disengaged. This is also associated with a reduction in the torque fluctuations, so that it is possible to dispense with any damping of the torque fluctuations by means of the electric machine.

In a further embodiment, provision is made for the rotor to be able to be coupled to the output drive shaft by means of an interlocking device. As a result, the output drive shaft, which is preferably at the same time the gearbox input shaft, can be accelerated by activating the electric machine. The possibility of accelerating or retarding the output drive shaft by means of the electric machine is particularly advantageous for the purpose of active synchronization during a shifting operation.

In yet a further embodiment, a selector device is provided whose selector position enables the rotor to be selectively coupled to the clutch operator or to the output drive shaft. If the rotor is connected to the clutch operator by the selector device, then the clutch can be operated by activating the electric machine. If, on the other hand, the rotor is coupled to the output drive shaft via the selector device, active synchronization and vibration damping can be provided by the electric machine. In a further embodiment, provision is made for the stator to be mounted by means of a bearing so that it can rotate with respect to a component fixed to the bodywork. The stator is assigned a locking device by means of which any relative rotation can be prevented. Because of the force acting to conserve momentum, when the locking device is released, the stator is accelerated in a direction opposite to the rotational movement of the rotor. As a result of this deflection of the stator, the movement of the rotor is uniformly dampened.

It is advantageous to couple the stator to the rotationally operated clutch operator so that the rotational movement needed for operating the clutch can be introduced by the electric machine as a result of the activation of the electric machine, and on account of the restoring force which acts when the locking device is released. It is preferable if, by renewed switching of the locking device, the clutch can be locked, even in the disengaged state, or the stator can be locked in the appropriate position. In order to engage the clutch, it is advantageous to firstly reintroduce the restoring force provided to disengage the clutch and, in this state, to release the locking device in order to then reduce the restoring force which acts in order to engage the clutch.

The rotationally operated clutch operator may advantageously be designed such that it can be locked in the disengaged position or is self-locking and thus permits another use of the electric motor, for example for the synchronization operation with the clutch disengaged.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention will be described in more detail below using some exemplary embodiments. In the drawings:

FIG. 1 is a schematic block diagram of a drive arrangement for a motor vehicle according to an embodiment of the invention;

FIG. 2a is a schematic block diagram of a drive arrangement for a motor vehicle according to another embodiment of the invention;

FIG. 2b is a modified view of the drive arrangement of FIG. 2a;

FIG. 2c is a modified view of the drive arrangement of FIG. 2a;

FIG. 2d is a modified view of the drive arrangement of FIG. 2a;

FIG. 2e is a schematic block diagram of a drive arrangement for a motor vehicle according to a further embodiment of the invention;

FIG. 3 is a schematic block diagram of a drive arrangement for a motor vehicle according to another embodiment of the invention;

FIG. 4a is a schematic block diagram of a drive arrangement for a motor vehicle according to yet another embodiment of the invention;

FIG. 4b is a modified embodiment of the drive arrangement for a motor vehicle shown in FIG. 4a;

FIGS. 5a–5c schematically depict the operation of a locking device for fixing the clutch of the drive arrangement in a disengaged operating state;

DETAILED DESCRIPTION OF THE PRESENTLY PREFERRED EMBODIMENTS

Figure 6A:
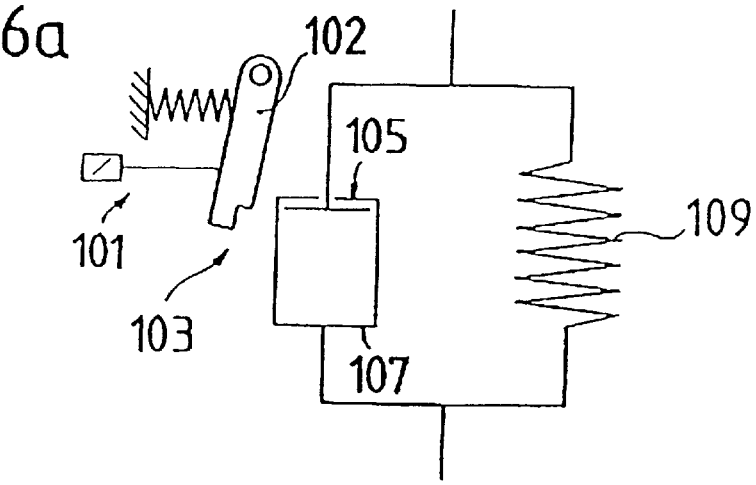
FIG. 6a is a schematic view of a switching device according to an embodiment of the invention.

FIG. 1 illustrates an internal combustion engine and electric machine combination 1, only the crankshaft 3 of the internal combustion engine being illustrated schematically. This crankshaft 3 is permanently connected to a flywheel 9. The flywheel 9 is part of a compact clutch 7, which is coaxially surrounded by a stator 23 on the electric machine 21. Compact clutch 7 has a clutch disk 11 provided with a torsional vibration damper 13. Clutch disk 11 is arranged axially between the flywheel 9 and a pressure plate 15, which is operatively connected to an associated diaphragm spring 17. In order to operate the compact clutch 7, a clutch operator 19 is coaxially arranged with the gearbox input shaft 27. The stator 23, coaxially surrounding clutch 7, is arranged to be stationary and, in the exemplary embodiment, is permanently connected to the engine housing. Provision may also be made to permanently connect the stator 23 to the gearbox housing. The stator 23 is coaxially surrounded by an associated rotor 25. This electric machine 21 is therefore an external rotor type machine 22.

The rotor is permanently connected to the flywheel 9 or the cover plate 10 of the compact clutch 7. Because of the radially external arrangement of the rotor 25, it has a high mass moment of inertia, due to its large radius. Due to the permanent connection (1) to the flywheel 9 and to the cover plate 10, the rotor 25 is part of the flywheel mass if the electric motor is not activated. By activating the electric motor, a torque which is directed counter to the torque fluctuations of the internal combustion engine can be provided by the electric motor, and the torque fluctuations of the internal combustion engine are thereby actively damped. In addition, the electric machine 21 illustrated can also be operated as a generator. During generator operation, some of the torque introduced by the internal combustion engine is converted into electrical energy. This electrical energy can be stored intermediately in an intermediate store (not illustrated) such as a vehicle battery or a capacitor. Provision may also be made to feed the electrical energy directly to an on-board network provided. By means of this electrical energy, the electric loads provided in the vehicle are operated.

In order to start the vehicle, provision may be made to operate the electric machine 21 as a motor and, preferably with the clutch 7 disengaged or with the gearbox in the neutral position, in order to accelerate the flywheel 9 to the required starting speed. Provision may also be made, with the clutch 7 disengaged and a gear selected, for a starting gear or reverse gear to provide for creeping or crawling operation of the vehicle as a result of its being driven only by the electric motor. The reverse gear may also be provided only electrically, for example, so that it is possible to dispense with the corresponding gears and the associated selector device in the gearbox, provided the electric machine can be coupled to the output drive shaft 27. Further possible couplings between the electric machine and clutch will be described using FIG. 2.

FIG. 2a illustrates various coupling possibilities between the electric machine 21 and the drive train and, alternatively, the clutch operator 19. The arrangement of the electric machine 21, clutch 7 and internal combustion engine corresponds to the arrangement already described in FIG. 1. Again, a compact clutch 7 arranged radially inside the electric machine is provided. The rotor 25 of the electric machine 21 is mounted on the flywheel 9 by means of a bearing 29 so that it can rotate. A fixed connection between rotor 25 and flywheel 9 can be switched by means of an interlocking device 53. When the interlocking device 53 is open, electric machine 21 is uncoupled from the drive train. In order to connect the electric machine, provision may be made to first accelerate the rotor 25 to the rotational speed of the flywheel 9 by means of activation as an electric machine 21, and then to couple it by switching the interlocking device 53. This possible coupling of electric machine and flywheel 9 of the internal combustion engine is identified by reference symbols (1) and (2).

When interlock 53 is closed, the following modes of operation are conceivable. Firstly, the torque can flow from the internal combustion engine to the electric machine 21, with the flywheel mass of the internal combustion engine being increased by the rotor. At the same time, the electric machine 21 can run/operate in generator mode, if required. The starter operation mode is defined when clutch 7 is disengaged, and the electric machine 21 is activated in order to provide and introduce a torque. When the clutch 7 is engaged, electric motor 21 supplements the drive torque of the internal combustion engine.

Rotor 25 of electric machine 21 is coupled to flywheel 9 via the coupling identified by (3), (4), and an interlocking device 63 which enables switchable coupling of the rotor to flywheel 9. Spring elements 57 are provided for torsional vibration damping and are each assigned a stop 59 for limiting any possible twisting angle. Provision is made for a device 61 for setting a desired effectiveness of the spring constant of the spring elements 57. The stops 59 prevent spring elements 57 being compressed into the position assigned to the maximum stressing energy during operation. These stops 59 are provided in order to take care of the spring elements 57, and are preferably ineffective doing normal operation. For starter operation, the electric machine 21 is operated as an electric motor by means of appropriate activation of the stator 23. As a result of current being applied to the stator 23, the rotor 25 is accelerated, resulting in a force applied to spring elements 57. Once spring elements 57 have had a minimum torque applied, the torque from the rotor 25 is transmitted completely to flywheel 9. Both the rotor 25 and the flywheel 9 are accelerated by means of appropriate activation of the stator 23. When a minimum rotational speed, which is required for a starting operation of the internal combustion engine, is reached, the internal combustion engine is started in the known way. The torque introduced by the internal combustion engine can subsequently be used, on the one hand for accelerating the flywheel 9 and, on the other hand, for accelerating the motor vehicle. Depending on the activation of stator 23, electric machine 21 can be operated as an electric motor or as a generator. Torsional fluctuations can subsequently be damped both by the electric machine, by active vibration damping and also by the torsional vibration damper 65, which comprises the spring elements 57 and the friction device 61.

A further link from the electric motor 21 to the compact clutch 7, in particular to the flywheel 9 or to the clutch operator 19, is also provided, for example as identified by the reference symbols (6) to (8) in FIG. 2a. The rotor 25 can be connected to the flywheel 9 and to the clutch operator 19 via an interlocking device 71. In the exemplary embodiment, rotor 25 is connected to the clutch operator 19 via an interposed spring element 67 and interlocking device 71. Rotor 25 can be connected to the flywheel 9 via a connecting path which includes stops 69 arranged parallel to the spring element 67, by moving to the stop position. As a result of providing a rotationally operated clutch operator 19, clutch 7 can be operated by appropriate activation of the electric machine 21.

The electric machine 21 can also be operated as a starter. In order to start the engine, stator 23 is driven in a first direction of rotation in order to accelerate rotor 25. The spring element 67 has force supplied to it by rotor 25, resulting in a change in the relative position of flywheel 9 and rotor 25. The force passed on by the spring 67 rotates the clutch operator 19, and clutch 7 is automatically disengaged. As rotor 25 continues to be driven in this direction of rotation, a small further tolerance path is passed through and, after the stop 69 has been reached, flywheel 9 is accelerated. The further starting operation does not differ from that previously described, so that further description is omitted here. Once the internal combustion engine has been started, a change in the relative position of the flywheel 9 and rotor 25, and thus the engagement of the clutch 7, can be specifically activated by activating the electric machine 21 in a predetermined way. In the process, the spring elements 67 are relieved of load.

In order to transmit torque with the engine running during generator operation, or with common production of the drive torque by electric motor and internal combustion engine, the interlocking device 71 or 73 has to be opened, and the alternatively provided, damped or undamped torque transmission path (1)–(2) or (3)–(4) has to be closed by means of the interlocking device 63 or, alternatively, 53, as shown in FIGS. 2a–2d.

In particular, provision may also be made for the rotor 25 to be able to be connected to the clutch operator 19 via an interlocking device 73, see FIGS. 2a–2c, identified by (5) or (6). If the electric machine can be coupled in only by means of such an arrangement (5), then the electric machine is provided only for operating the clutch operator.

If the clutch and starting path according to FIG. 2d is used, a starting operation with a reduced number of switching operations of interlocking devices 71, 63, 53 is possible by means of the transmission paths (6), (7), which can be selected via the interlocking device 71. Firstly, for a starting operation the interlocking device 63 or 53 (FIG. 2a) is opened and interlocking device 71 is closed. Disengagement is initially achieved by the electric machine 21 being activated, and as the drive continues the crankshaft 3 is accelerated by means of the electric machine 21, and thus the internal combustion engine is started. The interlocking device 71 is subsequently opened, and interlocking device 53 or 63 is closed again, whereas in order to start the motor vehicle in the design according to FIG. 2c, the interlocking device 53 or 63 has to be opened, and the interlocking device 73 has to be closed. The clutch 7 is disengaged as a result of the electric machine 21 being activated, and is brought into a stable position or fixed in the disengaged state, for example by means of a locking device 95 shown in FIG. 5. Interlocking device 73 is then opened and interlocking device 53 or 63 is then closed, and the internal combustion engine is started by activating the electric machine 21. Then, in a fashion corresponding to that described above, the interlocking devices 53 or 63 and 73 have to be operated in order to engage the clutch, and then must be operated again in order to uncouple the electric machine 21 at the flywheel 9 assigned to the internal combustion engine.

FIG. 2e shows a modified embodiment which has been simplified with respect to that of FIG. 2d. The rotor 25 is connected to clutch operator 19 which is assigned to the compact clutch via a torsional vibration damper, and which comprises a spring element 65, stops 59 and an adjusting device 61, via a down-line spring element 67, and can be connected to the flywheel mass 9 of the internal combustion engine via stops 69. An interlocking device 72 connected in parallel with the stops 69 and the spring element 67, enables the operative connection to the clutch operator to be switched freely. When the interlocking device 72 is closed, the clutch position is locked.

The functioning of this exemplary embodiment is described briefly below. For a starting operation, interlocking device 72 is first opened. The electric machine 21 is activated as an electric motor so that clutch operator 19 is operated into the disengaged operating position via spring element 67 in order to operate compact clutch 7. With the friction clutch disengaged, and with continuing drive, the stops 69 move into the "in-contact" position, and the flywheel mass of the internal combustion engine is accelerated. Once the minimum rotational speed has been reached, the internal combustion engine is started. Once the internal combustion engine is operating, the electric motor is activated at reduced power, so that the resulting relative movement acting on clutch operator 19 results in engagement of the friction clutch. With the friction clutch engaged, the interlocking device 72 is closed, which locks the engaged operating position of the clutch. The electric machine 21 can then be activated as a generator, with the rotor 25 being driven by the internal combustion engine via the torsional vibration damping with spring 67 and stops 69. Provision may also be made to activate the electric machine for active vibration damping.

In the following text, the possible links, illustrated in the lower half of FIGS. 2a–2e, between the electric machine 21 and the output drive shaft 27, which is at the same time the gearbox input shaft 28, will be discussed in more detail, as broken down in detail in FIGS. 3, 4a, 4b.

Via a selector 93, the rotor 25 can be coupled, identified by (13b), directly to the gearbox shaft 28, or can be coupled, identified by (13a), to the gearbox input shaft 28 via an interlocking device 91. This coupling or link is identified by (11). Depending on the position of selector 93, rotor 25 can also be coupled to clutch operator 19 as already described, identified by (14). This would correspond to the link illustrated with (5) in the top section of FIG. 2a. Furthermore, rotor 25 can be coupled to the gearbox input shaft 28, via the link which is identified by (16) and which has spring elements 79 and stops 89, directly or indirectly via interlocking device 91, as shown in FIG. 4b. Depending on the position of selector 93, rotor 25 can also be coupled to the clutch operator 19 via the unit comprising spring elements 79 and stops 89. In the event of a coupling to the gearbox input shaft 28, the vehicle can be driven by the electric motor 21 with clutch 7 disengaged. This may be advantageous, in particular in the case of desired low driving speeds, such as a crawling action of the vehicle. The electric machine 21 can also be activated for the purpose of active synchronization of the gearbox. If the neutral position in the gearbox is selected and the clutch is engaged, then the electric motor can be used as a starter by activating the electric machine as a motor with the clutch 7 engaged. If the electric machine 21 is coupled to the clutch operator 19, as identified by (15) (FIG. 4b), the engagement and disengagement of the clutch can be controlled by means of electric machine 21.

In the case of this illustrated link between rotor 25 and gearbox shaft 28, torque fluctuations can firstly be damped by the inertial mass of rotor 25, and the electric machine 21 can be activated for the purpose of active damping of torque fluctuations. Provision may also be made, by means of switching the various interlocking elements 53, 63, 71, 91 or 93 as a function of the operating state of the vehicle, to select one of the previously described possible links by switching the appropriate interlocking element.

In this exemplary embodiment, both a coupling disk equipped with a torsional vibration damper, identified by (10), and a coupling disk not equipped with a torsional vibration damper, identified by (9), are illustrated (see FIGS. 2a–3).

FIG. 3 illustrates further design variants, which are explained in detail below. Before the functioning is discussed, the construction will be described briefly once more. The crankshaft 3 is permanently connected to the flywheel 9 and the cover plate 10. Assigned to the flywheel 9 is the pressure plate 15, with the clutch disk 11 being axially arranged between the pressure plate 15 and the flywheel 9. Clutch disk 11 is connected to the gearbox input shaft 28 in a rotationally fixed manner. A clutch disk 11 provided with a torsional vibration damper 13 may be provided, as identified by (10). A simple design of a clutch disk 11, as designated by (9), can also be provided. The pressure plate 15 has force applied to it by means of the diaphragm spring 17 which, in turn, is acted on by force at the end opposite the pressure plate for the purpose of disengaging clutch 7 by means of clutch operator 19. This clutch illustrated in the top half of FIG. 3 is a compact clutch 7. In applications in which the axial installation space is not tight, such as in the case of a use in the utility motor vehicle sector, a conventional clutch 5 may be provided, as illustrated in the lower half of FIG. 3.

The construction illustrated in the top half of FIG. 3 will be described in more detail first. Arranged coaxially with the clutch is the stator 23, which is mounted by means of the bearing 39 so that it can rotate. The stator 23 is connected via a spring element 33 and an interlock 41 to the clutch operator 19, as identified by reference symbol (17). Arranged parallel to the spring element 33 are a stop 35 and a locking device 37, which are each also arranged parallel to each other. The spring element, which compensates for tolerances, may also be dispensed with, if appropriate. Stationary mounting of the stator 23 is ensured by switching the locking device 37. As a result of the locking device 37 being released, the operating force needed to disengage the clutch is provided by activating the electric machine 21 and using the restoring force of the stator on account of switching the momentum. In order to operate the clutch, the interlock 41 must be closed. In this exemplary embodiment, the rotor 25 is permanently coupled to the flywheel 9 mass.

The construction illustrated in the lower half of FIG. 3 will be described in more detail below. The electric machine 21 comprises the stator 23 and rotor 25, the stator being connected to the gearbox so as to be stationary, and the rotor 25, forming an external rotor 22, being arranged radially on the outside. This electric machine 21 is arranged parallel to the clutch 5 in the axial direction. The coupling of the rotor 25 to the gearbox input shaft 28 or to the clutch operator 19 corresponds to the coupling possibilities already described in FIG. 2a. However, the couplings described using the upper half of FIG. 2a can also be provided in the axially parallel arrangement of clutch and electric machine 21.

FIGS. 5a–5c illustrate an exemplary embodiment of a locking device 95 for fixing the clutch in an operating state, in particular in the position corresponding to the disengaged position. This locking device 95 has a latching element 97 which, when the desired operating position is reached, latches in an associated recess 99.

Figure 6B:
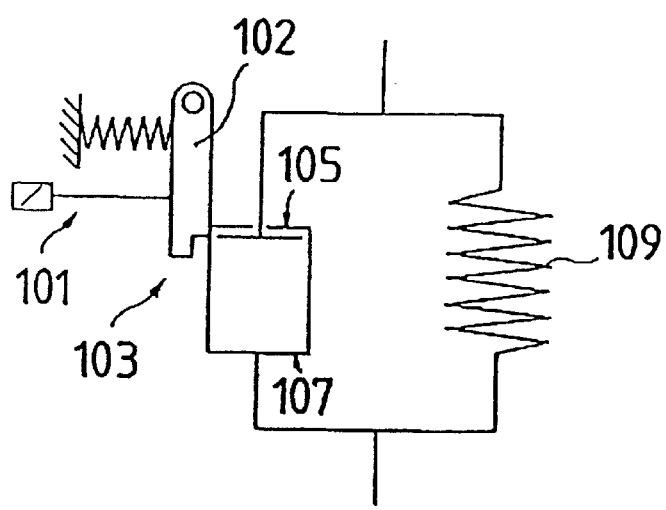
FIG. 6b is a schematic view of the switching device of FIG. 6a in a change over to generator mode.
Figure 6C:
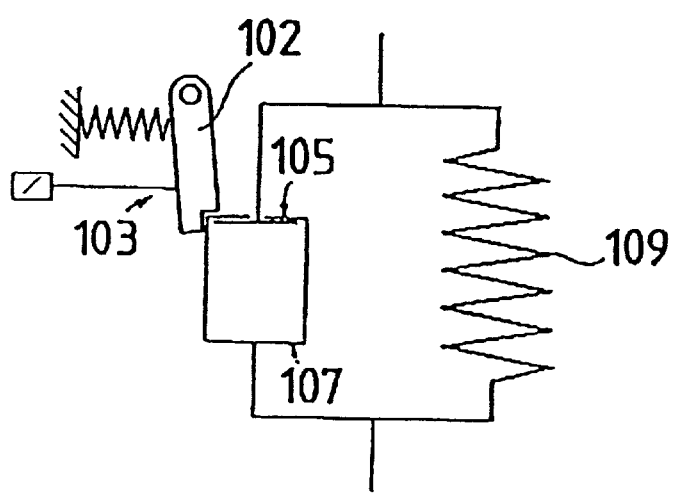
FIG. 6c is a schematic view of the switching device of FIG. 6a locked in the change over to generator operation mode.

An exemplary embodiment of a switching device 101 which can be provided as an interlocking device is illustrated in FIGS. 6a–6c. As shown in FIG. 6a, when the electric machine 21 is activated in the direction of traction for the purpose of acceleration, a torque is transmitted to the same from the flywheel 9. The switching device 101 is open.

A changeover from the traction direction, which corresponds to starter and actuator operation, in which a torque is introduced into the drive train by the electric machine 21, into an overrun operation, in which the electric machine 21 is operated as a generator, is illustrated in FIG. 6b. A stop element 102 of the fixing device 103 is activated for the purpose of locking the stop 105. Because of the overrun operation, the direction of force flow is reversed, as a result of which a spring element 109 arranged parallel to the stops 105 and 107 is pulled apart. The stop 105 latches, as shown in FIG. 6c, and the electric machine can be operated as a generator.

The invention is not limited by the embodiments described above which are presented as examples only but can be modified in various ways within the scope of protection defined by the appended patent claims.

We claim:

1. A drive arrangement for a motor vehicle having an internal combustion engine comprising:
    a clutch for operative coupling the internal combustion engine to an output drive shaft, wherein the internal combustion engine, said clutch and said output drive shaft form drive train;
    an electric machine operatively coupled to the clutch and having a rotor and a stator; and
    at least one switchable interlocking device operative to selectively couple the rotor to said drive train, wherein said switchable interlocking device comprises a switching mechanism, wherein said clutch further comprises a clutch operator, and said switching mechanism is operable to selectively couple the rotor to one of the drive train and the clutch operator.

2. The drive arrangement in accordance with claim 1, wherein said clutch further comprises a flywheel operatively connected to the internal combustion engine when said clutch is in a disengaged state, said at least one interlocking device being operatively connected to the rotor on one side and to the flywheel on an other side.

3. The drive arrangement in accordance with claim 2, wherein the rotor is coaxially arranged with said flywheel.

4. The drive arrangement in accordance with claim 1, further comprising a torsional vibration damper in communication with said rotor and having at least one spring element with a working point and associated stops, said rotor being operatively connected to the drive train with said torsional vibration damper being interposed between such connection, wherein said working point is adjustable in a predetermined manner by changing a relative position of the rotor with respect to a component of said drive train being connected to said at least one spring element.

5. The drive arrangement in accordance with claim 1, wherein said clutch is disposed at least partially radially inside said electric machine and further comprises a rotationally operated clutch operator operatively connected to said electric machine, wherein rotational movement required to disengage the clutch is introduced by activating said electric machine.

6. The drive arrangement in accordance with claim 1, further comprising at least one interlocking device for selectively coupling said rotor to the output drive shaft.

7. The drive arrangement in accordance with claim 1, further comprising a selector device for selectively coupling said rotor to one of said clutch operator and the output drive shaft.

8. The drive arrangement in accordance with claim 1, further comprising a bearing for enabling rotation of said stator with respect to a fixed clutch housing, and a locking device for preventing displacement of the stator with respect to the fixed clutch housing.

9. The drive arrangement in accordance with claim 8, wherein said electric machine provides rotational movement required to disengage said clutch using a restoring force resulting from when said locking device is released.

10. The drive arrangement in accordance with claim 1, further comprising an interlocking device for coupling the drive shaft to the clutch when said clutch is disengaged in order to provide active synchronization during a shifting operation.

11. The drive arrangement in accordance with claim 1, further comprising an interlocking device for de-coupling the rotor from the output drive shaft in order to reduce an inertial mass during a shifting operation.

* * * * *